INVENTOR.
ROBERT D. PIKE.

March 21, 1950 R. D. PIKE 2,501,189
PRODUCTION OF METALLIC IRON FROM IRON OXIDES
Filed March 17, 1947 3 Sheets-Sheet 2

INVENTOR.
ROBERT D. PIKE
BY Fay, Sobrick, Chilton & Isler.
Attorneys.

March 21, 1950 R. D. PIKE 2,501,189
PRODUCTION OF METALLIC IRON FROM IRON OXIDES
Filed March 17, 1947 3 Sheets-Sheet 3

INVENTOR.
ROBERT D. PIKE
BY Fay, Golrick, Chilton & Isler
Attorneys

Patented Mar. 21, 1950

2,501,189

UNITED STATES PATENT OFFICE 2,501,189

PRODUCTION OF METALLIC IRON FROM IRON OXIDES

Robert D. Pike, Pittsburgh, Pa.

Application March 17, 1947, Serial No. 735,066

1 Claim. (Cl. 75—35)

This invention pertains to the recovery of metal from its oxide and more particularly it relates to the direct reduction of metallic oxide, such as iron ore or other oxides, without fusion.

The present invention, by effecting utilization and regeneration of reducing gases in a recycling system, wherein endothermic reactions involved in making-up and re-constituting the reducing gas are carried out at a location remote from the reducing zone, provides for the recovery of metals from their oxides in a simple, highly efficient manner that is not only more economical than direct methods, but surpasses even the indirect processes in this respect, while yielding a product of great refinement at comparatively favorable production volume. Where iron is to be produced, treatment of ordinary hematite and magnetite of low impurity content in accordance with the present invention has yielded a product fully comparable to the widely esteemed Swedish iron, at less cost per ton than that of producing the greatly inferior pig-iron. The ineconomies and waste of indirect processes are avoided, and by-products are neither produced nor needed for marketing, to lower production costs. At the same time, the special problems posed by direct methods heretofore proposed are easily and practicably disposed of to render the present invention well adapted to commercial operations.

It is accordingly an object of the present invention to produce metals from their oxides expeditiously and economically.

It is another object to lower the initial investment required for equipment to recover metals from their oxides.

It is a further object to reduce fuel and power requirements necessary for such reduction.

It is a still further object to eliminate by-products and the need for marketing same.

Another object is to make possible the economical recovery of metals from isolated deposits of ores not feasible by other methods.

It is a still further object to provide a method wherein the reducing agent is regenerated for re-use in the system.

It is a further object to accomplish these results in a continuous cycle and in a substantially automatic manner.

It is a further object to produce a more highly refined product than is possible by the indirect production methods currently in vogue.

It is a further object to provide a recyclic reduction method in which certain endothermic reactions are prevented from absorbing energy required at the reduction zone so as to preclude negating the exothermically derived energy therein.

Another object is to produce iron from domestic ore that compares favorably in yield and purity with high-premium Swedish iron, but at a fraction of the cost of the latter.

Further objects include the avoidance of expensive preparatory steps usually attending direct methods and the provision of novel means and method of operation whereby critical proportionality of reducing agent to metallic oxide and the requirement for high-yield ores are dispensed with.

Other objects and advantages will become apparent hereinafter when the following specification is read in conjunction with the accompanying drawings, in which Fig. 1 represents a simplified flow diagram of apparatus suitable for giving effect to one form of the invention;

In its simplest form, the invention contemplates the provision of a metallic oxide burden on a down-draft hearth having provisions for conducting the products of combustion and reduction to another part of the system where the reduction gases may be purified for re-use. At the out-set, the burden in the hearth is preheated by the introduction of combustion gas and air, preferably in substantially theoretically correct mixture for complete combustion, and, after it attains a temperature for reduction but below the fusion temperature of the burden, the combustion gas and air are turned off and the reducing gas, composed principally of hydrogen, carbon monoxide and nitrogen, is admitted. This gas is conducted downwardly through the charge where the hydrogen and carbon monoxide are combined with the oxygen in the charge to form water and carbon dioxide. The used gas is conducted to a dehumidifying and decarbonating system, wherein it is restored substantially to its initial active content. The restored gas is then impelled back to a reheating zone on the way to which additional make-up gas is added. The reheating zone, in addition to providing temperatures necessary to effect reconstitution of the reduction gas, may contain a catalyst for assisting this reaction. The gas is then conducted back to the burden of metallic oxide being processed, for re-use.

The oxide burden may be crushed ore, or if the original ore is too fine, or for any other reason, it may first be sintered, or nodulized. Sintering may be done on the down-draft hearth above referred to or it may be done on a sintering machine of well known type not illustrated. Even if the ore is coarse applicant may prefer to crush it so that the ore may pass a ¼" mesh screen and then to sinter this crushed ore before reduction in order to make a more easily reducible oxide.

Figure 1:
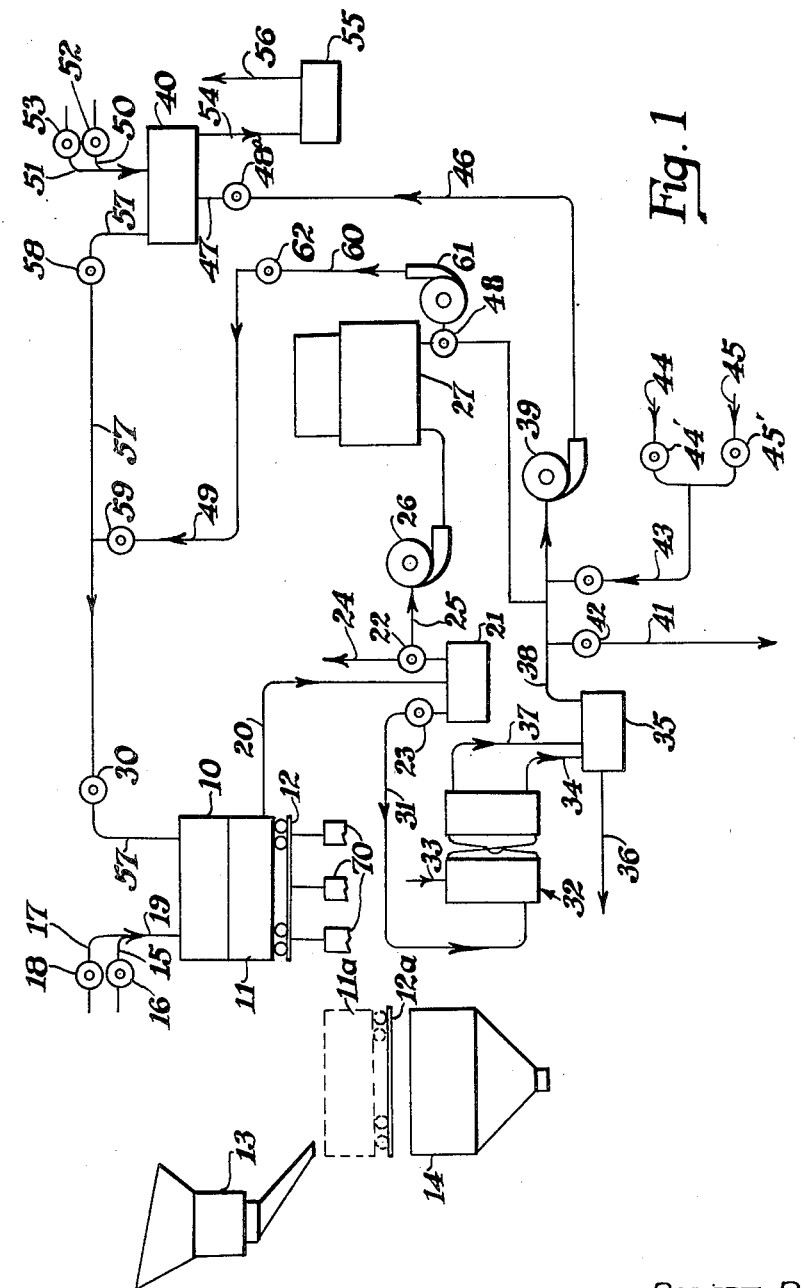

Referring now to Fig. 1, the reduction furnace is comprised of two parts, one of these being a stationary hood 10 and a movable down-draft hearth 11, which will be described in greater detail by reference to Fig. 2. The hearth 11 is provided with rollers, which cooperate with a trackway 12, which permit the hearth to be withdrawn to some position 11a for cooperation with a charge bin 13 and a discharge bin 14. The method whereby this is accomplished will be described in connection with the succeeding figures.

Combustion gas is admitted through a line 15, through a control valve 16, together with air which is admitted through line 17 under the control of valve 18 for admixture with the gas in combustible ratio and thence into the furnace through line 19. The gases are ignited below the hood 10 and are conducted through the charge maintained in the hearth 11 to preheat the same to reducing temperature. The spent combustion gases are withdrawn from the bottom of the hearth through a duct 20 into a valve water seal 21. At this stage of the operation, by virtue of the fact that valve 22 is opened while valve 23 is closed, the gases are withdrawn from the water valve to a stack 24. As appears desirable, for reasons to be explained hereinafter, the valve 22 may be controlled to prevent the gases passing up the stack 24 and to allow them to pass along a duct 25 by the action of a blower 26 into a gas holder 27, where they are stored for use, later to be explained.

After the top of the charge in the hearth 11 has been brought to a temperature suitable for reduction (in the case of iron ore or sinter this is preferably in the neighborhood of 1830° F.) the gas and air valves 16 and 18, respectively, are shut off to end the preheating treatment and a valve 30 is opened to admit reducing gas. This may comprise gas derived from a coke-oven or natural gas, the active ingredients of which comprise principally carbon monoxide and hydrogen. This gas passes downwardly through the charge and out through the duct 20, in a manner similar to that already explained in conjunction with the products of combustion, and into the water valve 21. At this point, however, the valve 22, controlling the egress of gases both to the stack 24 and to the storage holder 27, is closed so that the spent reducing gas may not pass that way. The valve 23, however, is then in open position allowing the gases to pass through line 31 to a dehumidifying and decarbonating system 32.

The dehumidifying and decarbonating system 32 may be made of a number of scrubbers, in each of which the circulating gas is forced into intimate contact with a thin slurry of hydrated lime in counter-current. To the tower, in which this is accomplished, enough water is admitted through a line 33 to cool the gas to a temperature not exceeding 100° F. Enough lime should be present to combine with the carbon dioxide formed in the reduction. Approximately 550 pounds of lime is required per ton of metallic iron and this treatment, by removing the products of reduction, reconstitutes the gas in its active reducing form. An alternate purification may be accomplished by employing water in sufficient quantities to remove the carbon dioxide by solution, in which case the water after having become saturated with the gas is aerated by contact with air to remove the carbon dioxide and returned for re-use. For this reason, a line 34 carries the solution into a water valve seal 35 and thence through pipe line 36 to the aerator. The purified reducing gas is withdrawn from the purification system 32, through a line 37 into the valve water seal 35 and thence outwardly through line 38 to a blower 39, by which it is impelled to a reheating stove 40, presently to be described. Since, by virtue of the admission of air for propagating the original preheating combustion in the hearth, and since by the constitution of the reducing gas itself, nitrogen is continually admitted to the system and since nitrogen is neutral in effect, it is necessary, to maintain it at a minimum, to bleed about 5% of the gas emitted from the purification system before re-circulating it. This is accomplished through a bleeder line 41, which is controlled by a valve 42. Then to make up for losses, and for the purpose of introducing the reducing gas to the system in the first instance, a supply line 43, which is fed by a coke-oven or natural gas feeder line 44 and a steam pipe 45 for make-up, respectively controlled by valves 44' and 45', is provided between the bleeder line 41 and the blower 39 for the purpose of conducting make-up gas, along with the purified gas, to the reheater 40. This is accomplished by means of a pipe line 46 and 47 through a valve 48a, which controls the flow of gas into the reheater 40 through the line 47.

The reheater 40 is of a type commonly referred to as a Royster stove, which contains refractory elements, such as discrete particles of inert material or a checker system, which are heated by the admission of combustion gas through line 50 in conjunction with air through a line 51 controlled respectively by valves 52 and 53 by the combustion of which, within the reheater, the refractory content is heated. During the period in which the refractories contained within the reheater 40 are being heated by combustion, the reducing gas is excluded by control of the valve 48. The products of combustion are withdrawn from the reheater by a line 54 through a valve water seal 55 and thence outwardly through a stack 56. The temperature attained by the refractories within the reheater is such as to heat the reducing gas admitted thereto after the valves 52 and 53 have been shut off to a temperature of about 1900° F., whereby the make-up gas is reformed into the reducing gas and passes on, together with that which has been purified and reheated, along a line 57 through control valve 58 and thence through the control valve 30 back into the reducing furnace.

The reformation of the make-up gas with steam may be considerably accelerated by the presence of a catalyst, such as nickel, included with the refractories in the reheater 40, although this is not absolutely necessary.

After the burden in the hearth 11 has been completely reduced, the time for which will vary in accordance with the size of burden and in proportion to the flow of gas, it is necessary to cool the charge to below the temperature at which it will reoxidize. This is preferably accomplished in a manner which will not only not reoxidize the charge but which will also maintain the nitrogen level of the system at a desirable maximum. For this purpose the reducing gas itself, at some stage before it reaches the reheater, is caused to pass through the charge in cold condition until it is below temperature of oxidation. In a preferred embodiment this is accomplished by the line 49 controlled by valve 48, whereby it is conducted back to the line 57 and thence through the valve 30 into the furnace.

After the temperature has been sufficiently reduced in this manner, the reducing gas, by further regulation of the valve 48, is shut off altogether and a non-oxidizing gas, which will not disturb the balance of the system, may be admitted to complete the cooling cycle. For this purpose the gas originally derived from the combustion of gas and air in the hearth to preheat the charge, some of which has been withdrawn and held in the holder 27, as already described, is highly satisfactory since it is non-oxidizing and conforms to that which has already been in the system. To this end the gas in the holder 27 is impelled along line 60 by blower 61 and through a valve 62 which is, of course, in open position to pass the gas along through the line 49 to the reduction gas feed line 57 and thence through the valve 30 and into the furnace where it passes through the charge until cooled. During this operation the gas is again taken off through duct 20 into the valve water seal 21, from whence it is passed either outwardly through the stack 24 or back into the holder 27, depending on the position of the valve 22. During this interval the valve 23 will be kept closed.

The hearth bearing the charge is then lowered, together with its supporting section of track 12, into a position in which the latter aligns with an adjacent section of stationary track 12a, thus, to permit the hearth to be withdrawn to the position 11a, over the bin 14 into which the reduced metal may be dumped. A new charge of ore or sinter is derived from some suitable hopper positioned as at 13 and the hearth returned to operating position. It will be understood that the amount of cooling of charge before dumping is largely optional. In certain cases it may be preferable to have the reduced charge hot so that it may be dumped into an extrusion press, not shown, or the like. The raising and lowering of the hearth is preferably carried out by means of hydraulic jacks 70, stationarily positioned beneath the furnace hood 10. This construction will now be described in connection with Figs. 2 and 3.

The rigid parts of the furnace comprise a hood 10, in which the preheating gas and air is admitted through lines 15 and 17, respectively. The hot reducing gas is admitted through duct 57 under the control of the valve 30 while the cold reducing gas is admitted to the duct 57 and thence into the furnace through the line 49 under the control of the valve 59.

For cooperation with this hood structure, a hearth 11 is adapted to be raised and lowered into cooperation therewith for the purposes previously described. The hearth comprises a body portion 80 having water-cooled sides 81 and a water-cooled bottom 82. A grate-bar assembly 83 is horizontally disposed between the side walls at a suitable distance above the bottom 82. The grate-bars are individually cooled by ducts 84.

Figure 2:
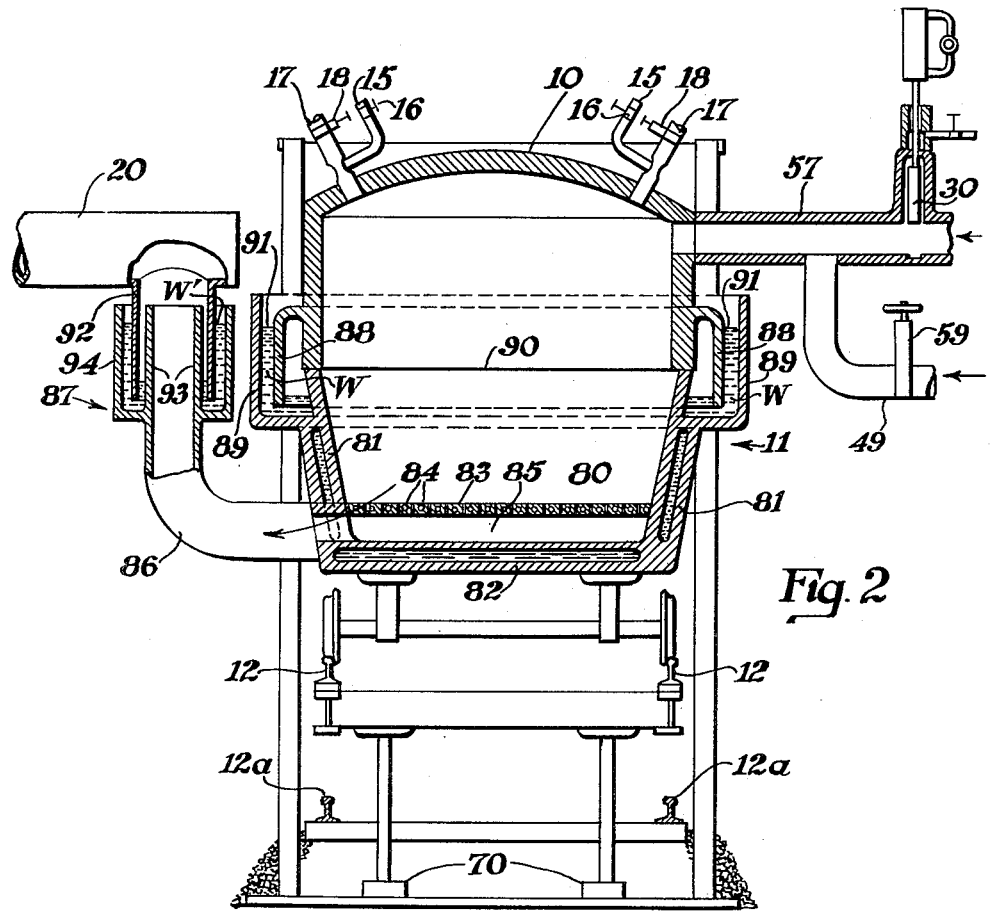
Fig. 2 is a transverse sectional elevational view of a preferred form of reduction equipment used in the system illustrated in Fig. 1.

In operating position, such as shown in Fig. 2, the gas is admitted to the hood and drawn downwardly through any charge carried by grate-bars 83 and thence outwardly through the passage 85 between the grate-bars and the bottom, into a duct 86, which connects by water seal 87 with the duct 20, which has been previously described. The hood 10 at its lower extremity is provided with a continuous depending skirt 88 which is off-set outwardly from the line of the side walls so as to extend over and beneath the upper edge of the hearth 11, when the latter is raised into engagement therewith. In a similar manner the movable hearth is provided with an upwardly extending flange 89, which is adapted completely to encompass the depending skirt 88 on the hood. A quantity of water is retained by the flange 89 and the walls of the hearth so that, when the latter are raised into contact with the lower edge of the hood proper, they form a tight seal therewith, as at 90. Since operating pressures within the hearth and hood are above atmospheric (about 16" water gauge), the water within the bounds of the hood 88 is depressed and displaced outwardly of the skirt 88 to a higher level as at 91.

Figures 3, 4:
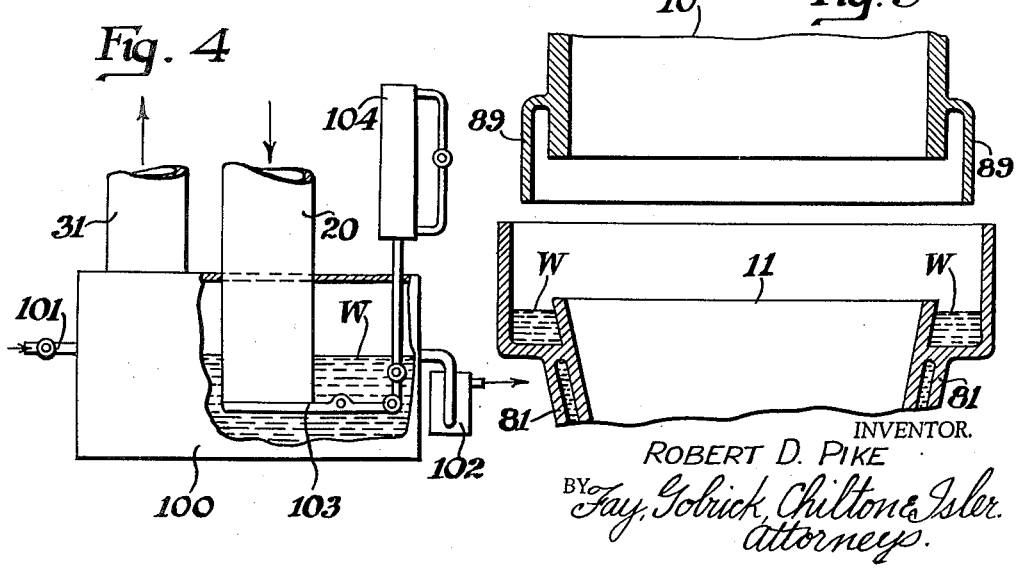
Fig. 3 is a fragmentary sectional elevation showing certain parts of the apparatus illustrated in Fig. 2 in open position.
Fig. 4 is a side elevational view of a valve water seal, shown with parts broken away.

The lowered position, whereto the hearth is removable from the hood, is disclosed in Fig. 3. As it is described, this is made possible by a plurality of hydraulic jacks 70 which lift the section of track carrying the hearth when it is disposed immediately beneath the hood, upwardly out of alignment with tracks 12a, so as to force as tight an engagement as possible between the contiguous edges 90 between the hearth and the hood. The water W serves to make this a gas-tight seal.

In similar manner is the duct 86 removably connected to the duct 20, which latter is provided with a stub section of pipe 92, which completely surrounds the inner section 93 of the duct 86. An outer wall 94, also annular in shape, but of greater diameter than the stub pipe 92, is secured to the duct 86 for retaining a level of water W' therein. This is effective in a manner already described to retain the gases in the system and to exclude the gases of the outer atmosphere.

In Fig. 4 is illustrated a valve water seal comparable to those previously referred to at 21, 35 and 55 in Fig. 1. This comprises a hermetic container 100 into which gas is admitted as through a duct 20 to below a level of water W therein contained. An outlet duct 31 is provided for egress of the gas above the water line. A level of water may be maintained by a feed line 101 and regulated by an automatic level controlled drain 102. When gases are not being admitted to the water seal through duct 20, it is desirable to provide a mechanical valve 103, which is controlled by an air motor 104 to open and close the duct.

Figure 5:
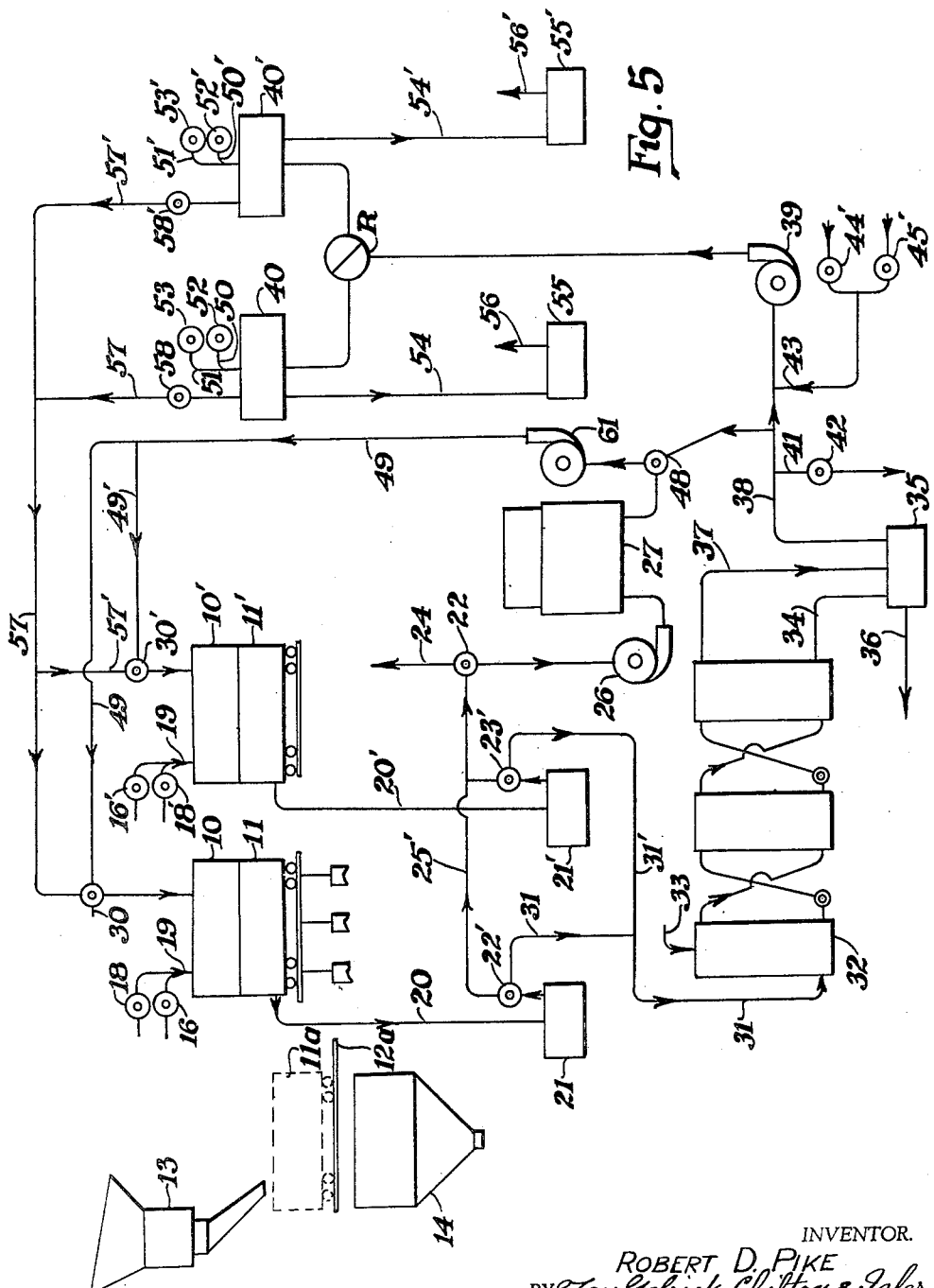
Fig. 5 is a flow diagram corresponding to Fig. 1, showing the relationship of a duplicate system whereby continuous operations may be maintained.

In Fig. 5 there is illustrated a system comparable to Fig. 1, but which embodies duplicate features to illustrate one arrangement for making the present invention continuous. In this figure like reference numerals have been applied to like parts throughout in one system with the same numerals adapted to describe corresponding parts in the parallel system with the addition of a prime marked to each. The operating cycle is as follows: Let it be assumed that a charge of reduced metal has just been removed from the hearth 11 and that a new charge has been loaded from the hopper 13 and the hearth is back in position for reduction. Under this condition a combustion mixture is supplied through the line 18 to preheat the charge. At this time the valve 30 is closed to prevent admission of any reduction gas, whether hot or cold. The products of combustion are withdrawn through the duct 20 into the valve water seal 21 and outwardly through a valve 22', which controls the entry of the gas alternatively to the line 31 or to the stack line 25'. In this instance, since products of combustion is the gas in question, the valve 22' is set so as to pass the gas emitted from the water seal 21 into the line 25 and thence to the stack 24, which is made possible by setting of the valve 22 for this purpose. Also by controlling the valve 22, the gases may be impelled by the blower 26 into the holder 27 for later use in cooling charges of reduced material.

While this preparatory cycle is in progress, the adjacent hearth 11', let it be assumed, is in its reduction cycle whereby the combustion gases for preheating are excluded by closing the valves 16' and 18' and hot reduction gases are admitted through the lines 57, 57' and through the valve 30', which is regulated to admit the hot gas to the hearth while excluding the cold gas that otherwise be derived from lines 49, 49'.

The reduction gas is drawn downwardly through the charge, as previously described, and passes outwardly through the duct 20' downwardly into the valve water seal 21', from whence it is taken, by controlling the valve 23', into the line 31' thence to the line 31 into the dehumidifying and decarbonating system 32. It will be understood that the valve 23', were the second hearth in its preheating cycle, would be adjusted to exclude the gases from the line 31' and to pass them to the stack or storage line 25'.

From the purification system 32 the purified reduction gases are brought through the valve water seal 35, in a manner previously described, through the line 38, past the bleeder take-off 41 and the make-up gas addition line 43 on through the blower 39 to the reheater stove 40. To maintain continuous operations, a reheater is provided for as many hearths as are in operation. In the given example of Fig. 5, the gas may be passed either to the reheater 40 or the reheater 40' by a reversing valve R. While one reheater is being used to heat the reduction gas, the other stove is being placed in condition for subsequent operations by being heated by the burners, previously described. As shown, the reversing valve will conduct the gases into the reheater 40, from whence the reheating combustion gases are excluded, and thence upwardly through the line 57 back to the other hearth in operation.

As soon as the primary hearth is preheated to the necessary extent, the combustion gas is shut off by controlling the valves 16 and 18 and the valve 30 is adjusted to admit hot reducing gas from the line 57, thence into the hearth to repeat the cycle. At the same time the reheater valve R will be turned to admit the reducing gases coming from the purification and make-up systems into the reheater 40', from whence the combustion gases are now excluded, so as to supply a flow of hot gases to the line 57, through to the feed 57'.

The reduction having been completed in the hearth 11' will necessitate that the valve 30' be adjusted to exclude hot gases from entering through the line 57 but to allow the admission of cold reduction gas from the line 49 to enter the hearth through the line 49'. This in turn is made possible by controlling the valve 48 to allow cold reduction gas to be drawn off ahead of the reheater by impulsion derived from the blower 61. In this manner, while one-half of the system is in the preparatory cycle for reduction, the other half of the system is actually reducing, neither being in conflict with the other, even though a considerable amount of apparatus is usable in common. Thus, is a continuous method derived.

In an apparatus of the character illustrated in Fig. 5, if it is assumed that the dimensions of each hearth is 10' x 25' in lateral dimensions, and capable of holding a 48" bed of iron ore or sinter, the reduction of the sinter by the present process will approximate 90% of completion and the production of metallic iron will be from 500 to 550 tons daily in about a 50% yield ore.

As a specific example, the following analysis dry basis has been reduced to yield a magnetic sinter containing about 60% iron as magnetite:

| | |
|---|---|
| $Fe_3O_4$ | 80.1 |
| $SiO_2$ | 11.25 |
| $MnO_2$ | .17 |
| $Al_2O_3$ | .44 |
| CaO | .31 |
| MgO | .26 |

The charge is about 125,000 lbs., which is reduced 90% in about an hour and a half including a five to ten minute cooling cycle with the cold reduction gas. As the iron becomes cooled in the stream of cold reduction gas, there is a tendency for carbon monoxide to form carbon dioxide and carbon by the reaction $$2CO = CO_2 + C$$

The temperature limits of this reaction may be found by reference to Bulletin 270, United States Bureau of Mines, Production of Sponge Iron by C. E. Williams, E. P. Barrett, B. M. Larson, 1927. As it is undesirable to have C form in the bed, cooling with reducing gas should either be stopped at this point, say 1000° F. and the charge dumped, or cooling should be continued with the stored gas of combustion, the $CO_2$ of which at this temperature will not appreciably oxidize iron and no C can be formed because CO is absent or very low in this gas.

However, any $CO_2$ that may be formed by this reaction is removed by the dehumidifying and decarbonating system. It will ordinarily be advantageous as soon as the metallized charge has been cooled below its active tendency to be oxidized by $CO_2$, to use the combustion gas from the heating operation, stored in holder 27, for completing the cooling. This has the further advantage of purging all of the combustible gas from the system before disengaging the pan from the hood.

In this example, coke oven gas is used as fuel and as make-up in the reduction cycle. This gas has about the following composition:

| | Percent by volume, dry basis |
|---|---|
| $CO_2$ | 2.2 |
| $O_2$ | .8 |
| $N_2$ | 8.1 |
| CO | 6.3 |
| $H_2$ | 46.5 |
| $CH_4$ | 32.11 |
| $C_4H_{10}$ | 4.00 |

Lower heating value 550 B. t. u. per standard cubic foot.

Higher heating value 620 B. t. u. per standard cubic foot.

Air required for combustion per M—5540 standard cubic foot. (S. C. F.=1 cu. ft. gas at 60° F. and 30" barometer.)

Having filled the pan and brought it into gas tight contact with the hood, the burners 25 supply coke oven gas and air for heating up. This takes about 45 minutes and requires 4040 standard cubic feet coke oven gas per ton metallic iron. Products of combustion passing down through the bed have about the following composition:

|  | Percent by volume |
|---|---|
| $CO_2$ | 8.9 |
| $N_2$ | 70.6 |
| $H_2O$ | 20.5 |

When these go to holder 27, after passing through water seal 21, most of the water will have been condensed.

After the heating period which heats the top of the sinter bed to about 1832° F. and the bottom to approximately 1292° F. the hot circulating reducing gas is switched on, requiring 87,000 standard cubic feet for reduction per ton metallic iron. This circulating gas has about the following analysis:

|  | Percent by volume |
|---|---|
| $CO_2$ | .237 |
| $O_2$ | .269 |
| $N_2$ | 20.000 |
| $CO$ | 18.250 |
| $H_2$ | 60.000 |
| $H_2O$ | 1.290 |

The gas leaving the bottom of the pan during reduction has about the following analysis:

|  | Per cent by volume |
|---|---|
| $CO_2$ | 4.82 |
| $O_2$ | .269 |
| $N_2$ | 20.000 |
| $CO$ | 13.650 |
| $H_2$ | 42.300 |
| $H_2O$ | 19.000 |

It is important and a part of the invention that the net result of the reduction of the oxides by the circulating reducing gas be exothermic. Because of this the circulating reducing gas may be supplied at a temperature only slightly above that most desirable level for reduction and also may start the reaction with the oxide at the bottom of the bed at a somewhat lower temperature than at the top, as has been indicated to be the case. The extra sensible heat of the circulating reducing gas as well as the net exothermic heat of the reaction will in a relatively short time heat the entire bed to the temperature necessary for reduction.

The following is a quantitative analysis of the thermochemical effects during reduction:

*Heat to be supplied during reduction*

The iron produced by the process must be raised from approximately 1574° F. to 1832° F. requiring about, 258×.1675 on 43 B. t. u./lb. Fe. 1574° F. is the average temperature top and bottom of the furnace charge, after preheating. From this point it has to be raised to 1832° F., which is assumed to be the average temperature of reduction.

The losses to the outside through the walls are estimated as follows:

|  | Sq. ft. |
|---|---|
| Roofs over two pans | 476 |
| Sides of two pans, assuming a height of 10' for pan and hood | 620 |
| Total external area | 1096 |

| | |
|---|---|
| Assume an average loss of 500 B. t. u. per sq. ft. per hour giving total per hour | 548,000 |
| B. t. u. per lb. of iron | 17.2 |

The heat of the reaction is estimated as follows:

For the purpose of estimating the heat, the reaction is assumed to take place at 918° C., 1682° F. although as above stated it may take place at a somewhat higher temperature, namely 1000° C. or 1832° F. and indeed the higher temperature is used in estimating the sensible heat to be added to the iron above the average temperature of preheating.

$$Fe_3O_4 + 4CO \rightleftharpoons 3Fe + 4CO_2$$

The exothermic heat according to U. S. Bureau of Mines, Bulletin 270, is 306 B. t. u. per lb. 20.4% of the total Fe is made by this reaction.

79.6% of the total iron is made by the following reaction:

$$Fe_3O_4 + 4H_2 \rightleftharpoons 3Fe + 4H_2O$$

The endothermic heat of this reaction at 918° C. is 57.6 B. t. u. per lb.

The thermo-chemical effect is therefore as follows:

Exothermic heat, .204×306= 62.4
Endothermic heat, .796×57.6= 45.8
———
16.6 B. t. u/lb. iron Summing up, the heat to be supplied is as follows:

| | |
|---|---|
| Increased sensible heat of iron | 43 |
| Loss to outside | 17 |
| Total | 60 |
| Deduct exothermic heat | 17 |

| | |
|---|---|
| Net heat to be supplied by sensible heat of circulating reducing gas | 43 B. t. u. /lb. Fe |
| Same per ton Fe | 86,000 B. t. u. |

This heat must be supplied by heating the circulating gas above 1832° F.

Although the reaction with hydrogen is far more rapid than with CO, which applicant relies upon in obtaining 90% reduction, or better, in about 1½ hours, applicant prefers not to use a volumetric ratio, $H_2/CO$ of more than 3.3/1 lest the endothermic nature of the hydrogen reduction throw too much of a burden upon the system.

The circulating gas is introduced to the pan at an average rate of about 32,500 standard cubic feet per minute but the actual rate must be 5 to 10% higher than this because of the dead time when the cold reducing gas is used for cooling the iron.

Make-up of coke oven gas is introduced continuously into the suction of blower 39 at the rate of about 2840 standard cubic feet per minute or about 7600 standard cubic feet per ton metallic iron.

The total consumption of coke oven gas for heating the pans and heating the Royster stoves 40,40', after taking account of using about 3900 standard cubic feet bled gas per ton metallic for heating the stoves is 10,730 standard cubic feet per ton metallic iron. This gives a total consumption of coke oven gas for heating and reduction of 18,330 standard cubic feet per ton iron or about 11,370 B. t. u., using the higher heating value of the gas, or 10,100,000 lower value. This compares with about 22,000,000 B. t. u. in the coke in the iron blast furnace and presents the most economical method yet devised for metallizing iron ore without fusion. Each ton of iron metallized requires about 216 pounds steam in the reforming operation.

Natural gas acts much the same in applicant's process as coke oven gas, except that only about half as much is used and a greater percentage of carbon monoxide and a lesser percentage of nitrogen appears in the circulating gas.

Another iron ore which is suitable for use in applicant's process is the Iron Mountain ore near Cheyenne, Wyoming. Typical analysis of this ore follows:

| | |
|---|---|
| $TiO_2$ | 24.02 |
| $Fe_2O_3$ | 45.07 |
| $FeO$ | 20.65 |
| $SiO_2$ | 2.00 |
| $MgO$ | 3.19 |
| $CaO$ | .12 |
| $P$ | None |
| $S$ | 0.4 |
| $Cr_2O_3$ | .06 |
| $Al_2O_3$ | 4.85 |
| $V_2O_5$ | .50 |

After 90% reduction of the iron, this ore has the following analysis:

| | |
|---|---|
| $TiO_2$ | 29.30 |
| $Fe_2O_3$ | 5.50 |
| $FeO$ | 2.50 |
| $Fe$ | 49.30 |
| $V_2O_5$ | 0.60 |
| Other ingredients | 12.80 |

The above titaniferous ore after reduction can be melted in a cupola or electric furnace to melt the iron and the $TiO_2$ can be slagged in highly fusible form by the addition of some sodium carbonate or lime, or both. Thus a high grade synthetic scrap can be made and a concentrate of $TiO_2$ which can be refined further to produce a pigment grade of titania, or ferro-titanium.

When the reduced charge is melted under reducing conditions the vanadium oxide is reduced and the vanadium with a small amount of titanium goes with the iron. Upon melting the iron can be blown in a convertor and the titanium will be slagged off first, followed by the vanadium. In this way, they may be skimmed separately and recovered separately as a direct result of an initial reduction carried out in accordance with the present invention.

This application is a continuation-in-part of applicant's copending application Serial No. 486,527, filed May 11, 1943, now abandoned, entitled "Production of metals from their oxides."

I claim:

The process of reducing iron oxides without fusion comprising placing the oxide in a gas permeable bed upon a gas permeable support in a container and carrying out the several steps necessary for reduction and for placing the reduced metal in a relatively cool condition suitable for exposure to the air, separately and serially carrying out the following steps without movement of the charge as follows: first, heating by downdraft passage through the bed with gas of combustion in which free oxygen is substantially absent, diverting a portion of this gas after passing through the bed for use in cooling; second, passing reducing gas at about the same temperature as the bed downwardly through it to effect reduction of the oxide; third, passing unheated reducing gas downwardly through the bed to effect a partial cooling of reduced oxide; fourth, completing cooling by passing aforesaid unheated gas of combustion downwardly through the bed; fifth, dumping the reduced charge and replacing it with a fresh charge of oxide for repetition of the series; cooling the spent reducing gas issuing from the bed with water to remove $CO_2$ and $H_2O$ formed in reducing the oxide, diverting the portion of the cooled reducing gas to be used in aforesaid cooling of reduced oxide, mixing the make-up reducing gas with the balance, heating the mixed reducing gas for use with a fresh charge of oxide for reduction thereof.

ROBERT D. PIKE.

REFERENCES CITED

The following references are of record in the file of this patent:

UNITED STATES PATENTS

| Number | Name | Date |
|---|---|---|
| 812,247 | Westman | Feb. 13, 1906 |
| 1,256,623 | Westberg et al. | Feb. 19, 1918 |
| 1,574,382 | Farup | Feb. 23, 1926 |
| 1,638,684 | Edwin | Aug. 9, 1927 |
| 1,829,268 | Edwin | Oct. 27, 1931 |
| 1,849,561 | Wiberg | May 15, 1932 |
| 1,864,593 | Gustafsson | June 28, 1932 |
| 1,902,090 | Musso | Mar. 21, 1933 |
| 2,048,112 | Gahl | July 12, 1936 |
| 2,132,149 | Edwin | Oct. 4, 1938 |
| 2,142,100 | Avery | Jan. 3, 1939 |
| 2,200,772 | Erdmann | May 14, 1940 |
| 2,265,812 | Nagel | Dec. 9, 1941 |
| 2,287,663 | Brassert | June 23, 1942 |
| 2,367,262 | Brassert | Jan. 16, 1945 |

FOREIGN PATENTS

| Number | Country | Date |
|---|---|---|
| 466,592 | Great Britain | Aug. 26, 1935 |